May 14, 1968 — T. DEIGHTON — 3,383,288
LIQUID COOLED NUCLEAR REACTOR
Filed Nov. 9, 1965
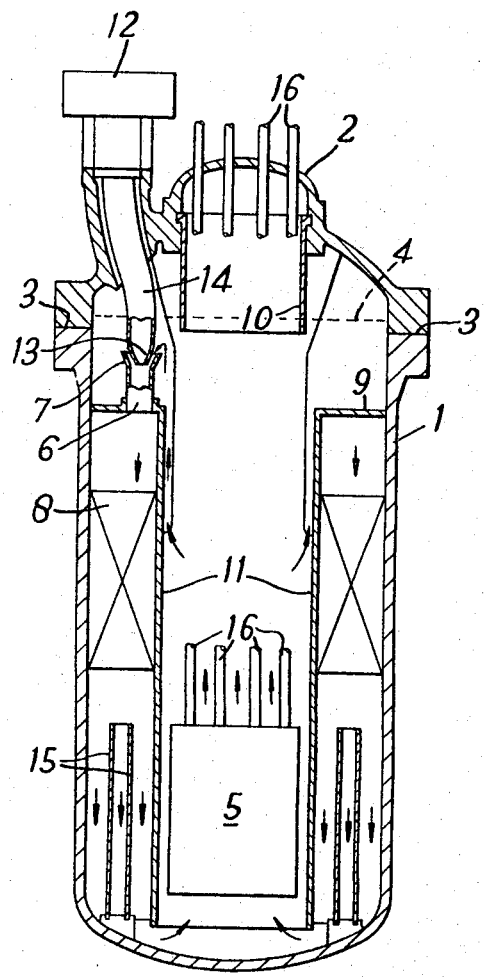
INVENTOR
Thomas Deighton
BY
*J. P. Moran*
ATTORNEY

United States Patent Office 3,383,288
Patented May 14, 1968

3,383,288
LIQUID COOLED NUCLEAR REACTOR
Thomas Deighton, Mill Hill, London, England, assignor to Babcock & Wilcox Limited, London, England, a corporation of Great Britain
Filed Nov. 9, 1965, Ser. No. 506,968
Claims priority, application Great Britain, Nov. 10, 1964, 45,772/64
6 Claims. (Cl. 176—61)

ABSTRACT OF THE DISCLOSURE

A liquid cooled nuclear reactor having a reactor vessel containing a reactor core, a heat exchanger, and a body of coolant liquid in which the reactor core and the heat exchanger are immersed. Provisions are made for circulation of coolant liquid through the core and heat exchanger back to the core including a pump arranged to draw in liquid from the vessel and to discharge it through a nozzle as a jet into a duct opening at its outlet end to the heat exchanger and at its inlet end to a body of coolant liquid, thereby increasing the rate of circulation of coolant.

---

This invention relates to nuclear reactors of the type in which the vessel containing the core also contains a heat exchanger and a heat transfer liquid, usually held under pressure, is circulated between them.

According to one aspect of the present invention, there is provided a liquid cooled nuclear reactor having a reactor vessel combining a reactor core, a heat exchanger, a body of coolant liquid in which the reactor core and the heat exchanger core are immersed, means defining a path through which the coolant liquid can circulate successively through the core and the heat exchanger, the path including a duct of which an opening lies beneath the surface of the body of coolant liquid, and means for discharging a jet of liquid from the body into the duct to entrain liquid from said body through said opening and thereby increase the rate of flow of coolant along the path.

If the discharging means is to be located outside the vessel, it is advantageous for the conduit penetrating the vessel wall to have as small a diameter as feasible, since the wall will be weakened and may require reinforcing in the vicinity of the conduit, especially if high internal pressures are involved.

According to another aspect of the invention there is provided a nuclear reactor comprisnig, within the same vessel as the core, a combination of a nozzle and a duct, a heat exchanger and sufficient heat transfer liquid to fill the vessel to a level above the duct, and outside the vessel, discharging means arranged to draw in liquid from the vessel and to discharge it through the nozzle as a jet into the duct, whereby to entrain more of said liquid to flow with the discharged liquid.

An embodiment of the invention will now be described, by way of example only, with reference to the accompanying drawing, which shows in sectional elevation an upright cylindrical pressure vessel with a closure and, partly in diagrammatic form, associated nuclear reactor equipment.

The drawing shows at 1 the pressure vessel having thick walls and a dome-shaped closure 2 seal-welded on at 3. Water, as a heat transfer liquid, is contained up to a level designated by the dashed line 4, whereat it covers the reactor core 5 and a ring of three vertical ducts, one of which is visible at 6. Each of the ducts has a conical-mouthed top end 7 serving as the diffuser of a respective injector pump 12.

The water is circulated between the core 5, where it is heated, and a bank of heat exchangers 8 of annular form, bank. The secondary liquid is also water, arranged to be where it gives up heat to a secondary heat transfer liquid which enters secondary circuits in the heat exchanger boiled in heat exchanger 8. The primary water does not boil since it is at high pressure.

The circulation path for the primary water, indicated by arrows in the drawing, is defined by an annular top partition 9 and a cylindrical partition 11.

The top 9 stops passage of water except via ducts 6. This path would be described by the water due to natural circulation, even if no pump were used, but in operation it is mainly due to the effects of one or more mechanical pumps that circulatory flow is promoted. The pumps, one of which is indicated at 12, are of the impeller type.

All or most of the water circulated passes through one or other of the ducts 6. The nozzle portions 13 of each injector pump are connected to the output sides of the mechanical pumps 12, which are coupled to withdraw water from the vessel through the annular outer jacket of a coaxial conduit 14. Before this can be achieved, pump 12 must be primed by applying inert gas pressure on the surface of the water in a central enclosure 10, to force water up the outer jacket. The conduit penetrates the wall of the vessel, in this embodiment its closure, and it is preferable that each conduit so penetrating the wall be as small in diameter as possible. The nozzles 13 are coupled to the inner tubes of conduits 14. Impeller pump or pumps 12 thus form discharging means to discharge a jet of water through nozzle 13 into the top end of duct portion 6.

In operation, the water forced into the ducts 6 from the nozzles 13 entrains some of the surrounding water with it, so that considerably more water flows through the ducts than passes through the mechanical pump or pumps 12.

The water passes then to the heat exchangers 8, gives up heat to boil the secondary water, and then passes between a set of cylindrical thermal shields 15 surrounding the core, and around the bottom of the partition 11, to enter the core and take up another charge of heat.

The core, details of which are not shown in the drawing, comprises a number of spaced, parallel fuel element rods extending along the direction of flow and apertured so that the circulating water passes along their interiors as well as along the spaces between them. This provides the good thermal contact necessary for effective transfer of heat to the water of the energy released by nuclear fissions. The elements may be located and spaced by threading them through the cells in two or more spaced wire grids.

In this embodiment, the circulating water also serves as the moderator; further control of the reactivity rate is provided by cruciform-shaped bars of neutron-absorbent mataerial (not visible), which can be adjusted collectively or individually from positions in the core between the fuel elements, quenching or impeding the reaction, to positions outside the core, allowing unhindered reaction. These reactivity control bars are remotely manipulable by means of control rod 16 (shown broken) passing from the core through the closure of the pressure vessel.

By means of the arrangement described and illustrated, the necessity for the whole volume of circulated water to pass through one or another of the mechanical pumps is avoided, so these may be of smaller capacity. It should be remembered, however, that the pumping power required increases for a given total flow as the fraction of water handled by the mechanical pump(s) decreases, due to the increased energy losses with increase of momentum transfer to the entrained liquid. If, for this reason, less than 40% of the total flow should pass through the mechanical pumps, the extra required pumping power might rise above economically acceptable bounds for the relatively small units, for marine use, for instance.

In addition, if the fraction of liquid entrained is too high, very high nozzle velocities will be required. Preferably the flow rate through the duct is kept below 200 feet per second.

The arrangement described, with the mechanical pumps 12 outside the vessel, and handling not the whole of, perhaps as little as 40% of, the circulating volume, permits the use of smaller conduits 14, so the vessel walls are less weakened by the necessary penetration holes.

Another advantage of the arrangement shown is that natural circulation in the same direction prevails on any failure of the mechanical pumps. The ducts, heat exchangers and core should be arranged so that natural circulation flow alone can prevail to a sufficient extent to remove the decay heat of the core. In practice, the reactor is shut down automatically on failure of the mechanical pumps, so that only the residual heat, as the reaction decays, has to be removed.

What is claimed is:

1. A liquid cooled nuclear reactor having a reactor vessel containing a reactor core, a heat exchanger, a body of coolant liquid in which the reactor core and the heat exchanger are immersed, means providing a natural circulation fluid flow path through which the coolant liquid can naturally circulate successively through the core and the heat exchanger back to the core, the path including a duct having a conically shaped inflow end beneath the surface of the body of coolant liquid and an outflow end communicating with the heat exchanger, and means for assisting natural circulation of liquid from the core through the heat exchanger back to the core, said last named means including a nozzle opening into the inlet end of the duct, and an injector pump arranged to draw in liquid from the vessel and to discharge it through the nozzle as a jet into the duct to entrain additional liquid through the inlet end of the duct and thereby increase the rate of flow of coolant along said path, the inlet end of the duct serving as the diffuser of the pump.

2. A nuclear reactor according to claim 1, wherein the natural circulation flow path includes an upright partition disposed in and connected to the reactor vessel, surrounding the core, and cooperating with the reactor vessel to provide a coolant liquid flow space therebetween opening at its lower end to the core, the heat exchanger is disposed in said space, and the outflow end of said duct opens into the upper portion of said space.

3. A nuclear reactor according to claim 2, wherein the pump is disposed outside the reactor vessel and has concentrically arranged inlet and outlet conduits.

4. A nuclear reactor according to claim 1 wherein reactor vessel is pressurized, said liquid is water, and is arranged to boil a secondary transfer liquid, also being water, flowing through a secondary circuit in the heat exchanger.

5. A nuclear reactor according to claim 1 wherein 40% of the total liquid circulated flows through the mechanical pump.

6. A nuclear reactor according to claim 5, wherein the flow rate of the liquid through the duct is less than 200 feet per second.

References Cited
UNITED STATES PATENTS

| | | | |
|---|---|---|---|
| 3,150,051 | 9/1964 | Ammon | 176—61 X |
| 3,203,867 | 8/1965 | Williams et al. | 176—61 |
| 3,087,881 | 4/1963 | Treshow | 176—61 X |
| 3,202,584 | 8/1965 | Bogaardt et al. | 176—61 |
| 3,226,300 | 12/1965 | Zmola et al. | 176—61 |
| 3,231,474 | 1/1966 | Jones et al. | 176—61 X |
| 3,245,879 | 4/1966 | Purdy et al. | 176—61 X |
| 3,274,065 | 9/1966 | Kierulf et al. | 176—61 |

REUBEN EPSTEIN, *Primary Examiner.*